US011611928B2

(12) United States Patent
Manolakos et al.

(10) Patent No.: US 11,611,928 B2
(45) Date of Patent: Mar. 21, 2023

(54) SPATIAL PREEMPTION INDICATION FOR DOWNLINK, UPLINK, AND SIDELINK TRANSMISSIONS

(71) Applicant: QUALCOMM Incorporated, San Diego, CA (US)

(72) Inventors: Alexandros Manolakos, Escondido, CA (US); Seyedkianoush Hosseini, San Diego, CA (US); Gokul Sridharan, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/025,595

(22) Filed: Sep. 18, 2020

(65) Prior Publication Data

US 2021/0092671 A1 Mar. 25, 2021

(30) Foreign Application Priority Data

Sep. 24, 2019 (GR) .............................. 20190100409

(51) Int. Cl.
*H04W 48/12* (2009.01)
*H04L 5/00* (2006.01)
(Continued)

(52) U.S. Cl.
CPC ........... *H04W 48/12* (2013.01); *H04L 1/0013* (2013.01); *H04L 5/0048* (2013.01);
(Continued)

(58) Field of Classification Search
CPC ............... H04W 48/12; H04W 72/042; H04W 74/0833; H04W 28/0278; H04W 52/365;
(Continued)

(56) References Cited

U.S. PATENT DOCUMENTS

2009/0232050 A1* 9/2009 Shen ................. H04W 28/0278
  370/328
2017/0302368 A1* 10/2017 Trott ................... H04B 7/18502
(Continued)

OTHER PUBLICATIONS

CAICT: "Considerations on Pre-emption Issue in RA of NR V2X Sidelink Design", 3GPP Draft, 3GPP TSG RAN WG1 Ad-Hoc Meeting 1901, R1-1901127, 3rd Generation Partnership Project (3GPP), Mobile Competence Centre, 650, Route Des Lucioles, F-06921, Sophia-Antipolis Cedex, France, vol. RAN WG1, No. Taipei; Jan. 25, 2019-Feb. 1, 2019, Jan. 20, 2019 (Jan. 20, 2019), XP051593971, 8 pages, Retrieved from the Internet: URL: http://www.3gpp.org/ftp/Meetings%5F3GPP%5FSYNC/RAN1/Docs/R1%2D1901127%2Ezip [retrieved on Jan. 20, 2019] the whole document.
(Continued)

*Primary Examiner* — Kiet Tang
(74) *Attorney, Agent, or Firm* — Danai Nelisile Mhembere; Patterson & Sheridan, LLP

(57) ABSTRACT

Some aspects provide a method for wireless communication by a user equipment (UE). The method generally includes receiving signaling of a spatial preemption indication (PI), identifying, based on the spatial PI, at least one beam that the UE is preempted from using for at least one of transmitting or receiving at least one target signal, and refraining from using the identified beam for transmitting or receiving the target signal, for at least a time period.

27 Claims, 14 Drawing Sheets

(51) Int. Cl.

| | |
|---|---|
| *H04W 74/08* | (2009.01) |
| *H04W 72/04* | (2023.01) |
| *H04L 1/00* | (2006.01) |
| H04W 28/02 | (2009.01) |
| H04W 72/044 | (2023.01) |
| H04W 72/0446 | (2023.01) |
| H04W 52/36 | (2009.01) |

(52) U.S. Cl.
CPC ..... *H04W 72/042* (2013.01); *H04W 74/0833* (2013.01); *H04W 28/0278* (2013.01); *H04W 52/365* (2013.01); *H04W 72/046* (2013.01); *H04W 72/0446* (2013.01)

(58) Field of Classification Search
CPC ........... H04W 72/0446; H04W 72/046; H04W 28/0289; H04W 52/325; H04W 72/1242; H04W 72/1268; H04W 7/0408; H04W 48/02; H04L 1/0013; H04L 5/0048; H04L 5/0023; H04L 5/0053; H04L 5/0037; H04L 5/0044; H04B 7/0695
See application file for complete search history.

(56) References Cited

U.S. PATENT DOCUMENTS

| | | | | |
|---|---|---|---|---|
| 2017/0332406 | A1* | 11/2017 | Islam | H04B 7/0408 |
| 2019/0116565 | A1* | 4/2019 | Chae | H04W 76/14 |
| 2019/0222284 | A1* | 7/2019 | Huang | H04W 72/042 |
| 2020/0045674 | A1* | 2/2020 | Tseng | H04W 76/19 |
| 2020/0145082 | A1* | 5/2020 | Chen | H04W 72/042 |
| 2021/0126753 | A1* | 4/2021 | Mochizuki | H04W 72/1268 |
| 2021/0392506 | A1* | 12/2021 | Luong | H04W 76/36 |

OTHER PUBLICATIONS

Fraunhofer HHI., et al., "Multi-TRP for Enhanced Mobility", 3GPP Draft, 3GPP TSG RAN Meeting #84, RP-191341_MOBILITY_TRP,3rd Generation Partnership Project (3GPP), Mobile Competence Centre, 650, Route Des Lucioles, F-06921, Sophia-Antipolis Cedex, France, vol. TSG RAN, No. Newport Beach California, USA; Jun. 3, 2019-Jun. 6, 2019, May 27, 2019 (May 27, 2019), XP051739669.

Huawei, et al., "Enhancements on Multi-TRP/panel Transmission," 3GPP Draft, 3GPP TSG RAN WG1 Meeting #96, R1-1901567, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599264, 14 pages, Retrieved from the Internet:URL: http://www.3gpp.org/ftp/tsg%5Fran/WG1%5FRL1/TSGR1%5F96/Docs/R1%2D1901567%2Ezip [retrieved on Feb. 16, 2019], paragraph [2.1.3].

International Search Report and Written Opinion—PCT/US2020/051680—ISA/EPO—dated Dec. 4, 2020.

Motorola Mobility, et al., "Interrupted Transmission Indication for Multi-TRP Transmission", 3GPP Draft, 3GPP TSG RAN WG1 #97, R1-1907246, DLPI Multitrp, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728689.

Qualcomm Incorporated: "UL Inter UE Tx Prioritization/Multiplexing", 3GPP Draft, 3GPP TSG-RAN WG1 #94, R1-1809458, UL inter UE Tx Prioritization/Multiplexing, 3rd Generation Partnership Project (3GPP), Mobile Competence Centre, 650, Route Des Lucioles, F-06921 Sophia-Antipolis Cedex, France, vol. RAN WG1, No. Cothenburg, Sweden, Aug. 20, 2018-Aug. 24, 2018, Aug. 17, 2018 (Aug. 17, 2018), XP051516823.

* cited by examiner

DCI 2_1

| PI1 | PI2 | PI3 | PI4 |

• DCI 2_1 is group common, but the interpretation can be different for different UEs
  ° UE1: CC1→PI1, CC2→PI2, CC3→PI4
  ° UE2: CC1→PI3
  ° UE3: CC1→PI1, CC2→PI2

```
-- Associates one or two DL reference signals with a corresponding quasi-colocation (QCL) type.
-- FFS: Rename TCI-RS-Set to TCI-State? Would feel more in line with the name of the list: tci-States.
TCI-RS-Set ::=                      SEQUENCE {
    tci-RS-SetId                    TCI-RS-SetId,
    qcl-Type1
        referenceSignal             SEQUENCE {
                                    CHOICE {
            csi-rs                      NZP-CSI-RS-ResourceConfigId,
            ssb                         SSB-Id,
            -- A TRS (Tracking Reference Signal) configuration represented as a set of CSI-RS-Resources in a CSI-ResourceSetId
            trs                         CSI-ResourceSetId
        },
        qcl-Type                    ENUMERATED {typeA, typeB, typeC, typeD}
    },
    qcl-Type2
        referenceSignal             SEQUENCE {
                                    CHOICE {
            csi-rs                      NZP-CSI-RS-ResourceConfigId,
            ssb                         SSB-Id,
            -- A TRS (Tracking Reference Signal) configuration represented as a set of CSI-RS-Resources in a CSI-ResourceSetId
            trs                         CSI-ResourceSetId
        },
        qcl-Type                    ENUMERATED {typeA, typeB, typeC, typeD}
                                                                                    OPTIONAL
}
```

FIG. 8A

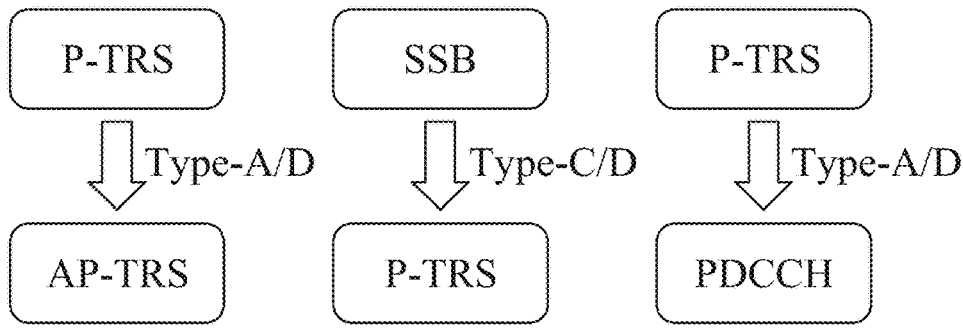

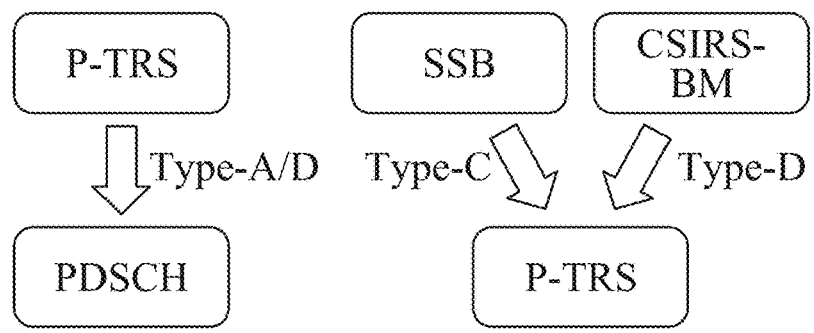

FIG. 8B

```
SRS-SpatialRelationInfo ::=   SEQUENCE {
    servingCellId                 ServCellIndex
    referenceSignal               CHOICE {
        ssb-Index                     SSB-Index
        csi-RS-Index                  NZP-CSI-RS-ResourceId,
        srs                           SEQUENCE {
            resourceId                    SRS-ResourceId,
            uplinkBWP                     BWP-Id
        }
    }
}
```

SPATIAL PREEMPTION INDICATION FOR DOWNLINK, UPLINK, AND SIDELINK TRANSMISSIONS

PRIORITY CLAIM(S)

This application claims benefit of the priority to Greece Provisional Application No. 20190100409, filed on Sep. 24, 2019, which is expressly incorporated by reference in its entirety as if fully set forth below and for all applicable purposes.

TECHNICAL FIELD

Aspects of the present disclosure relate to wireless communications, and more particularly, to techniques for indicating when one or more spatial directions should be avoided (by a user equipment) when transmitting or receiving a target signal.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

SUMMARY

The systems, methods, and devices of the disclosure each have several innovative aspects, no single one of which is solely responsible for the desirable attributes.

Certain aspects of the subject matter described in this disclosure can be implemented in a method for wireless communication by a user equipment (UE). The method generally includes receiving signaling of a spatial preemption indication (PI), identifying, based on the spatial PI, at least one beam that the UE is preempted from using for at least one of transmitting or receiving at least one target signal, and refraining from using the identified beam for transmitting or receiving the target signal, for at least a time period.

Certain aspects of the present disclosure are directed to an apparatus for wireless communication by a UE. The apparatus generally includes a memory and at least one processor coupled to the memory, the memory and the at least one processor being configured to receive signaling of a spatial PI, identifying, based on the spatial PI, at least one beam that the UE is preempted from using for at least one of transmitting or receiving at least one target signal, and refrain from using the identified beam for transmitting or receiving the target signal, for at least a time period.

Certain aspects of the present disclosure are directed to an apparatus for wireless communication by a UE. The apparatus generally includes means for receiving signaling of a spatial PI, identifying, based on the spatial PI, at least one beam that the UE is preempted from using for at least one of transmitting or receiving at least one target signal, and means for refraining from using the identified beam for transmitting or receiving the target signal, for at least a time period.

Certain aspects of the present disclosure are directed to a computer readable medium having instructions stored thereon for receiving signaling of a spatial PI, identifying, based on the spatial PI, at least one beam that the UE is preempted from using for at least one of transmitting or receiving at least one target signal, and refraining from using the identified beam for transmitting or receiving the target signal, for at least a time period.

Certain aspects of the subject matter described in this disclosure can be implemented in a method for wireless communication by an apparatus. The method generally includes identifying at least one beam corresponding to a direction at least one UE is to avoid using for at least one of transmitting or receiving a target signal, and transmitting, to the UE, signaling of a spatial PI that indicates the at least one beam.

Certain aspects of the present disclosure are directed to an apparatus for wireless communication by an apparatus. The apparatus generally includes a memory and at least one processor coupled to the memory, the memory and the at least one processor being configured to identify at least one beam corresponding to a direction at least one UE is to avoid using for at least one of transmitting or receiving a target signal, and transmit, to the UE, signaling of a spatial PI that indicates the at least one beam.

Certain aspects of the present disclosure are directed to an apparatus for wireless communication by an apparatus. The apparatus generally includes means for identifying at least one beam corresponding to a direction at least one UE is to avoid using for at least one of transmitting or receiving a target signal, and means for transmitting, to the UE, signaling of a spatial PI that indicates the at least one beam.

Certain aspects of the present disclosure are directed to a computer readable medium having instructions stored thereon for identifying at least one beam corresponding to a direction at least one UE is to avoid using for at least one of transmitting or receiving a target signal and transmitting, to the UE, signaling of a spatial PI that indicates the at least one beam.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIGS. 8A and 8B illustrate examples of spatial relationships between source and target signals.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for signaling and processing an indication of spatial preemption. As will be described in greater detail below, the spatial preemption may indication at least one beam that a user equipment (UE) is to avoid using for transmitting or receiving a target signal (for example to avoid transmitting a signal that might cause interference or avoid receiving using a beam that might be subject to interference).

Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
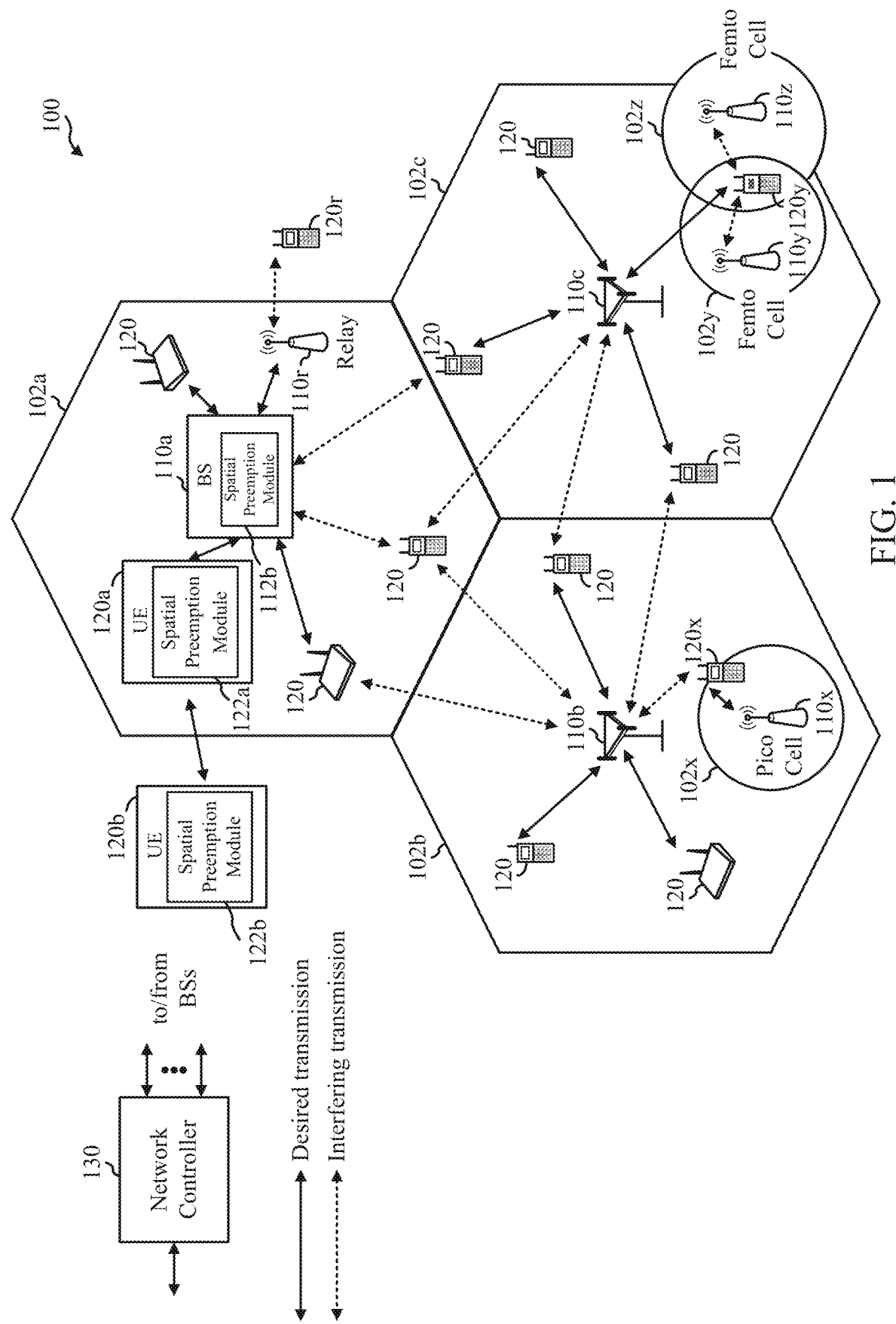
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a, UE 120b, and/or BS 110a may include a spatial preemption module (122a, 122b, and/or 112b, respectively) that may be configured to perform operations 1100 of FIG. 11 and/or operations 1200 of FIG. 12 to transmit and/or process spatial preemption indications as described herein.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
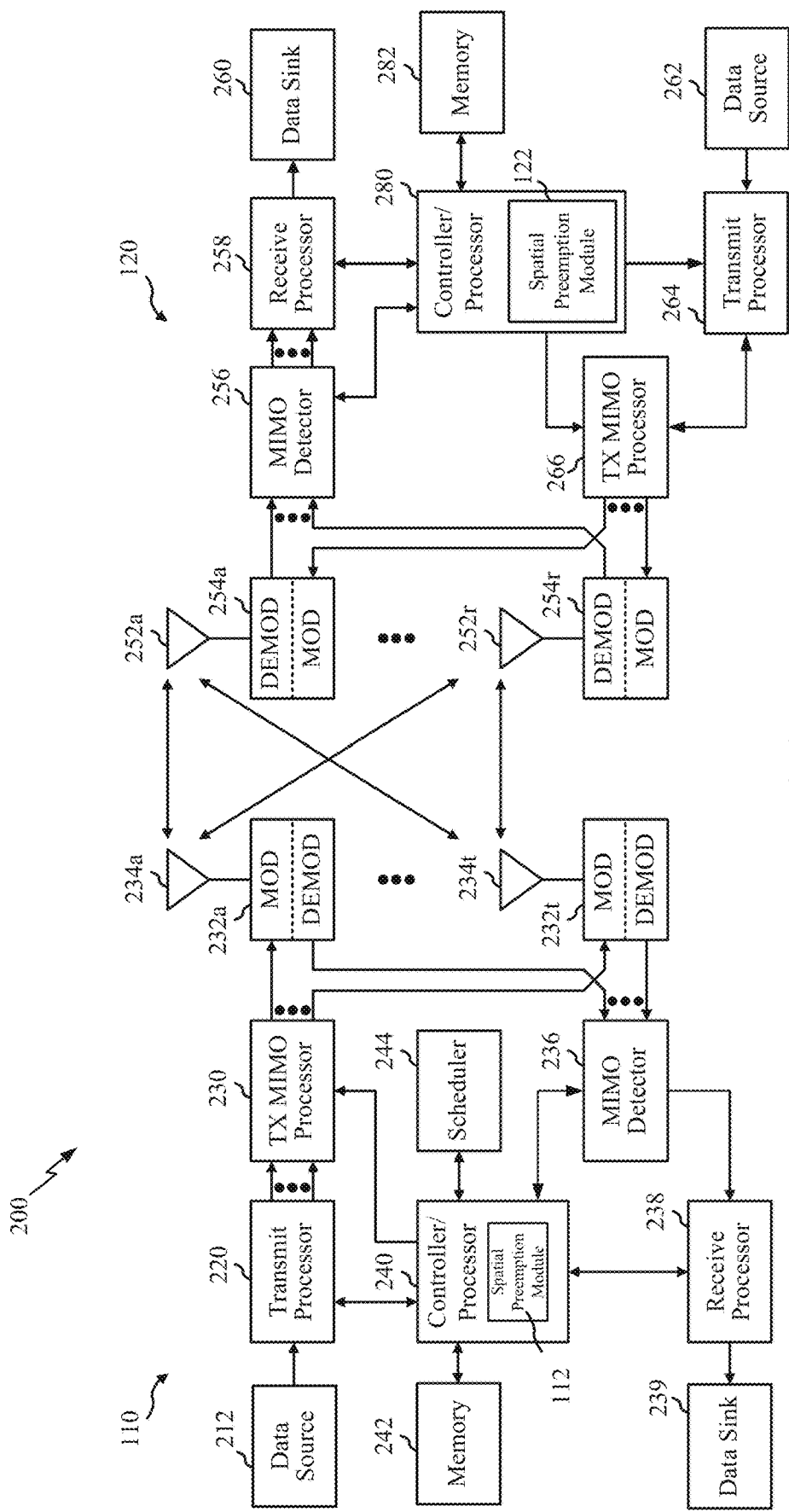
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a Spatial Preemption Module 122 that may be configured to perform operations 1100 of FIG. 11 and/or operations 1200 of FIG. 12. Similarly, the controller/processor 240 of the BS 110 has a Spatial Preemption Module 112 that may be configured to perform operations 1200 of FIG. 12. Although shown at the Controller/Processor, other components of the UE or BS may be used to perform the operations described herein.

Figure 3:
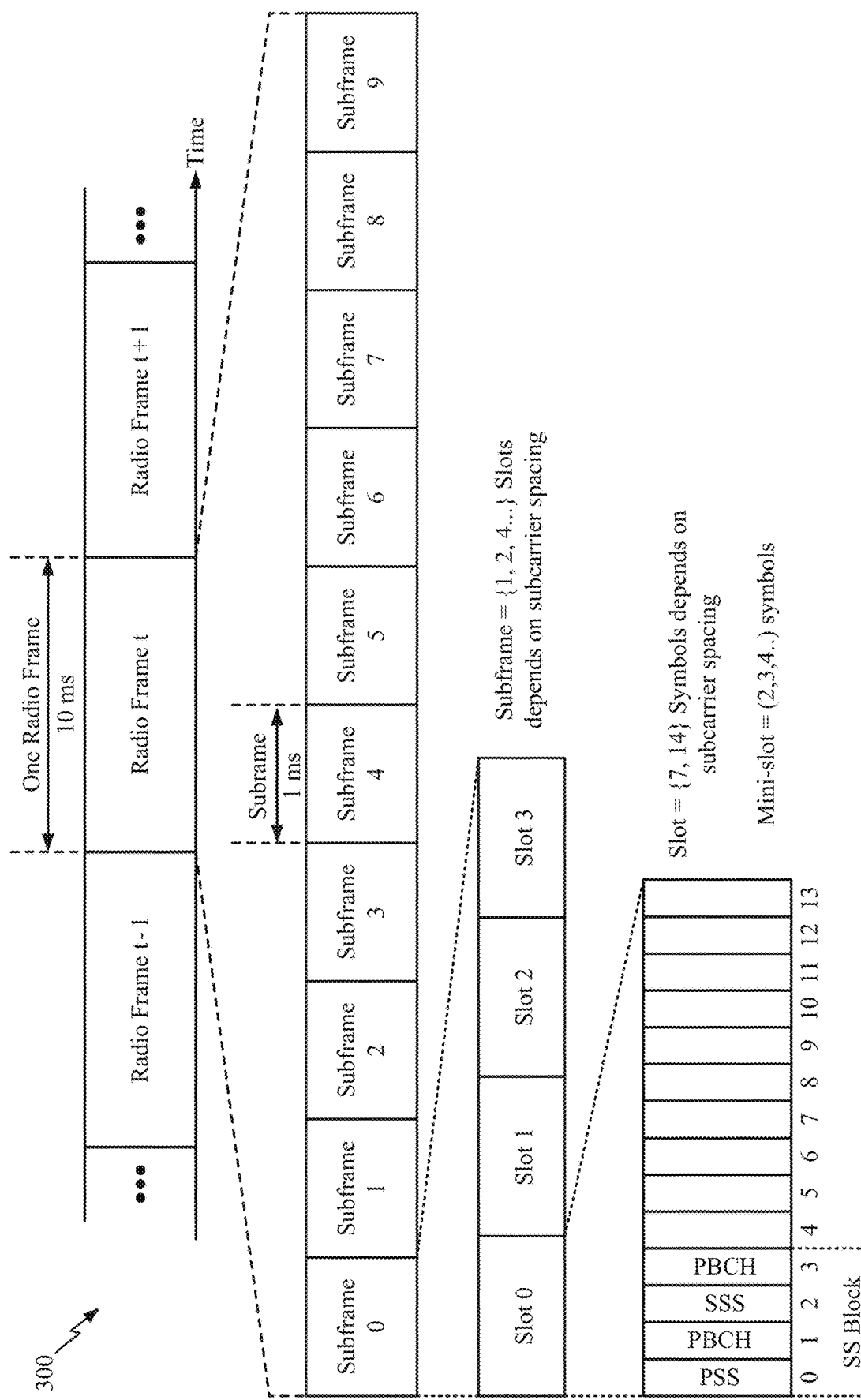
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. In some cases, these signals are examples of the types of signals that a false BS might fake in order to pose as a legitimate BS. The false BS may also fake other types of downlink transmissions (e.g., PDCCH, PDSCH) when posing as a legitimate BS.

The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 4B:
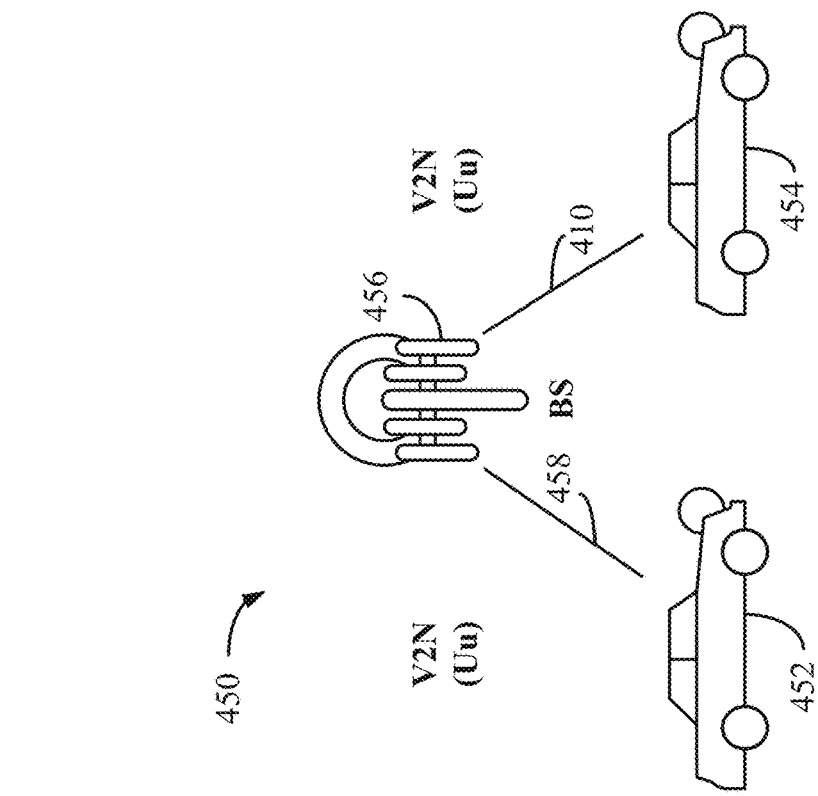
FIGS. 4A and 4B show diagrammatic representations of example vehicle to everything (V2X) systems in accordance with some aspects of the present disclosure.
Figure 4A:
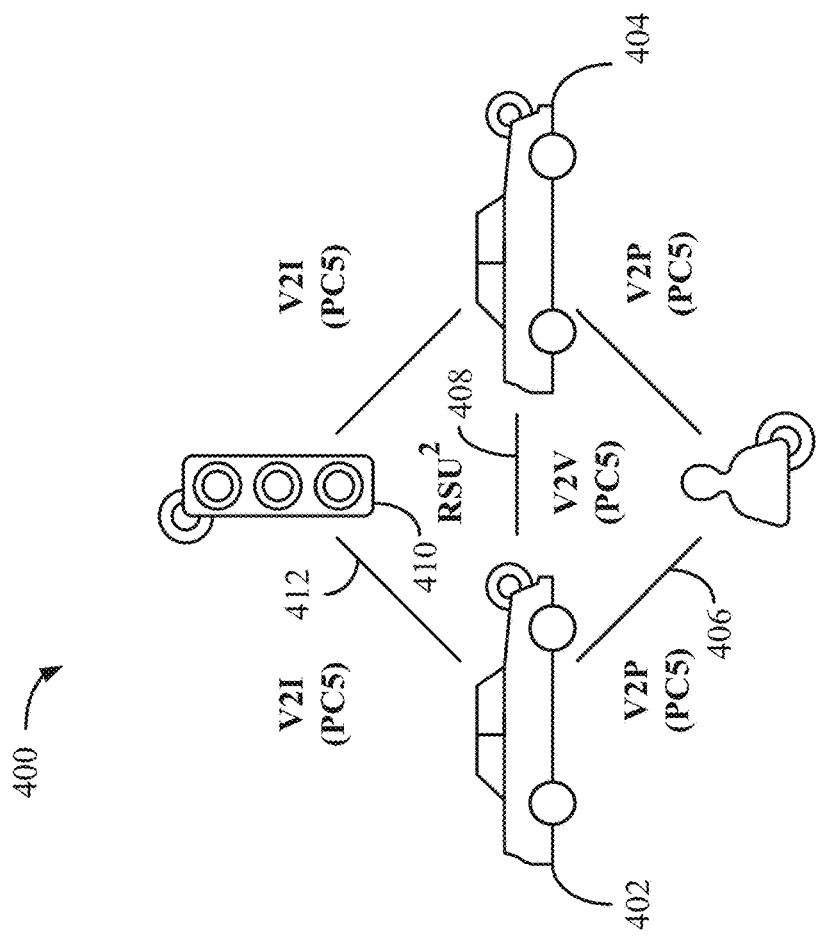

FIGS. 4A and 4B show diagrammatic representations of example vehicle to everything (V2X) systems in accordance with some aspects of the present disclosure. For example, the vehicles shown in FIGS. 4A and 4B may communicate via sidelink channels and may perform sidelink CSI reporting as described herein.

The V2X systems, provided in FIGS. 4A and 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a base station (for example, an eNB or gNB), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot Preemption in Systems that Support Multiple Traffic Types As noted above, NR supports multiple traffic types, such as eMBB and URLLC. In some cases, an ongoing eMBB transmission may be punctured or interrupted to send a higher priority URLLC transmission. This may cause loss of phase coherence between the two eMBB transmit durations that have been made non-contiguous by the URLLC transmission. For example, on the uplink (UL), the URLLC may have a different transmit power, which may cause loss of phase coherence. The URLLC may be scheduled in a different CC or BWP. If a UE has to tune-away the RF chain(s) to receive (on DL) or transmit (on UL) this URLLC and then tune-back for eMBB, it can cause loss of phase coherence.

Figure 5A:
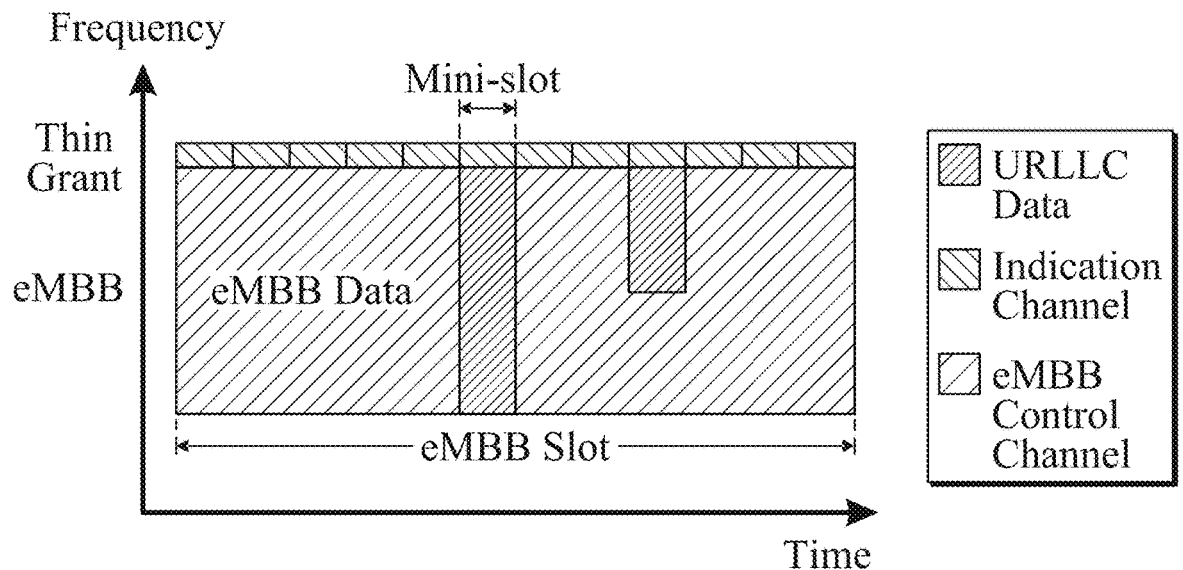
FIGS. 5A-5C illustrate examples of multiplexing different types of traffic that may lead to preemption.
Figure 5B:
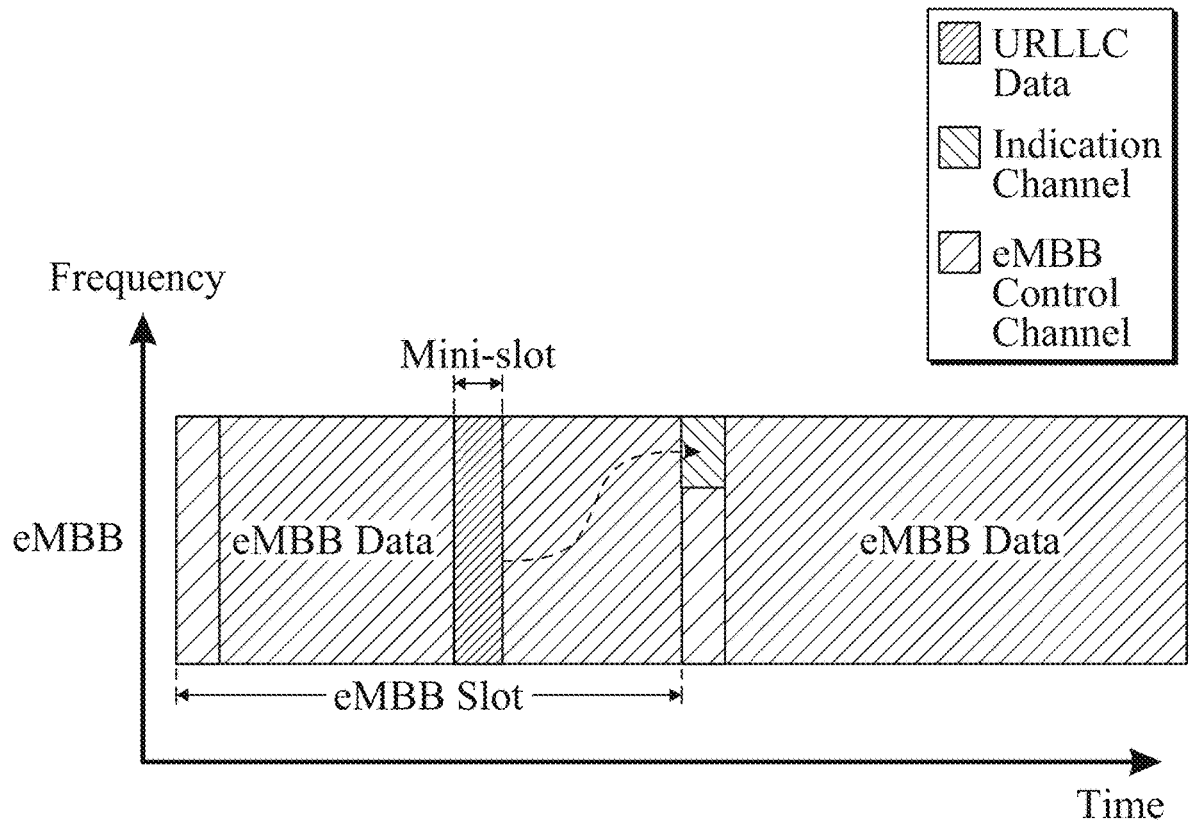
Figures 5C, 6:
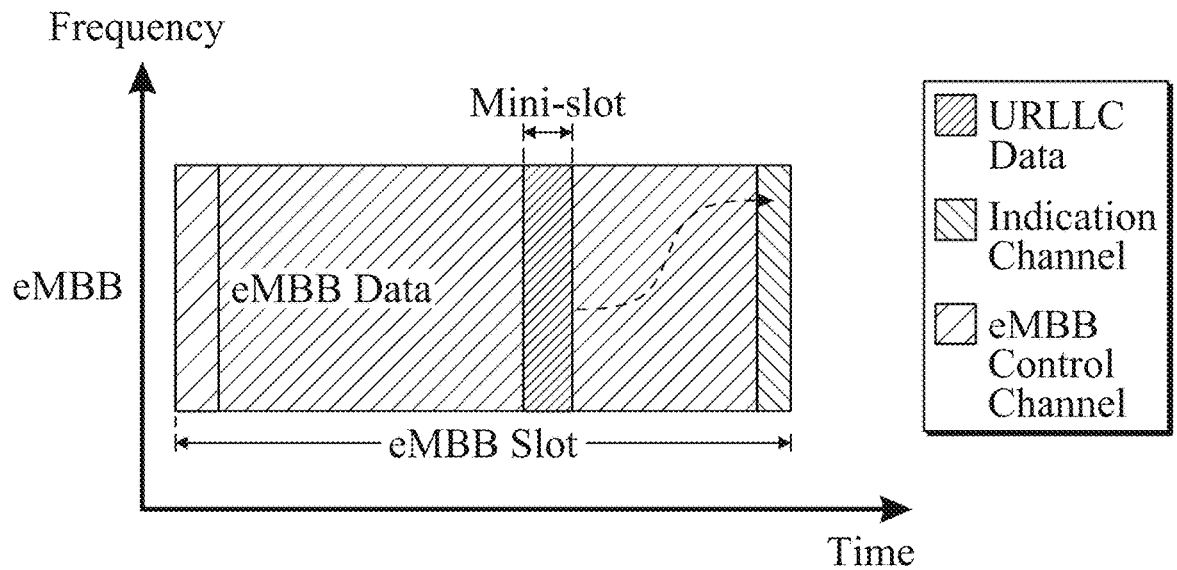
FIG. 6 illustrates an example format for preemption indication.

The indication-based multiplexing approach is beneficial for both URLLC and eMBB UEs, albeit at the cost of indicator overhead. As illustrated in FIG. 5A, for a current indication with respect to URLLC, a preemption indication (PI) downlink control information (DCI) is provided at the same time with URLLC data. As illustrated in FIG. 5B, for a post-indication for both the URLLC and the eMBB, the PI DCI is after both URLLC and eMBB data. FIG. 5C shows a post-indication for the URLLC, which is current with respect to the eMBB.

For DL PI, a DCI format (e.g., DCI format 2_1) may be used for notifying the physical resource block(s) (PRB(s)) and orthogonal frequency division multiplexed (OFDM) symbol(s) where the UE may assume that no transmission is intended for the UE. For example, a gNB may schedule an eMBB UE during a slot. In the middle of the slot, a packet for a URLLC UE arrives, and the gNB schedules and transmits the packet to the URLLC UE in a subset of resource blocks (RBs) and/or slots. The gNB provides an indication, via a DL PI (e.g., in the next slot), to the eMBB UE as to which of the RBs/symbols are punctured (e.g., and used for URLLC UE). The eMBB UE can thus use this information to enhance the decoding (this knowledge can increase the chance of successful decoding).

As illustrated in FIG. 6, information (e.g., PI 1, PI 2, . . . , PI N) is transmitted by means of the DCI format 2_1 with cyclic redundancy check (CRC) scrambled by an interruption radio network temporary identifier (INT-RNTI). In NR, each pre-emption indication may be 14 bits. As illustrated in FIG. 6, for each UE, different preemption indications can correspond to different component carriers (or serving cells).

Figure 7:
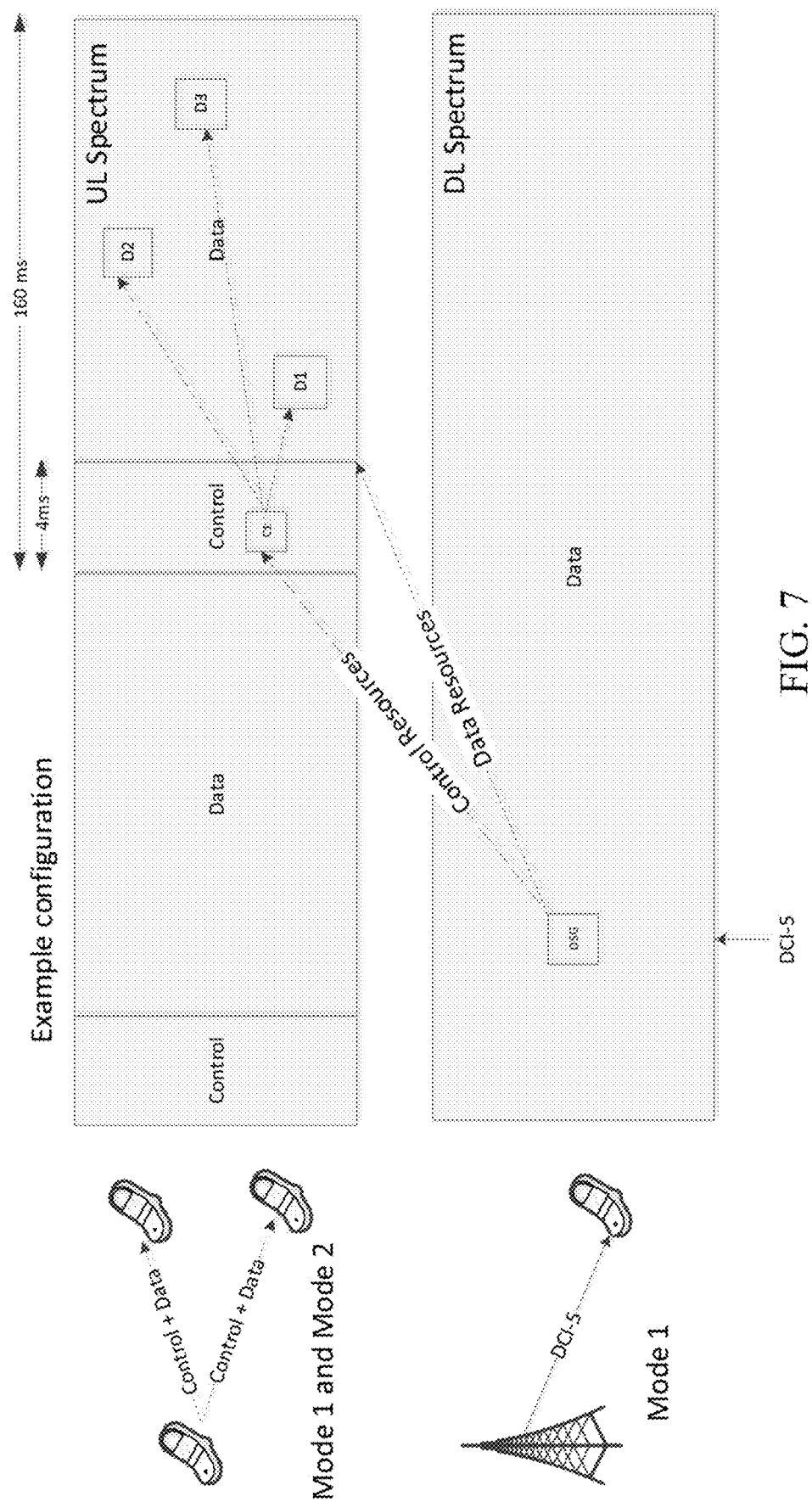
FIG. 7 illustrate example sidelink communications modes.
Figures 9A, 9B:
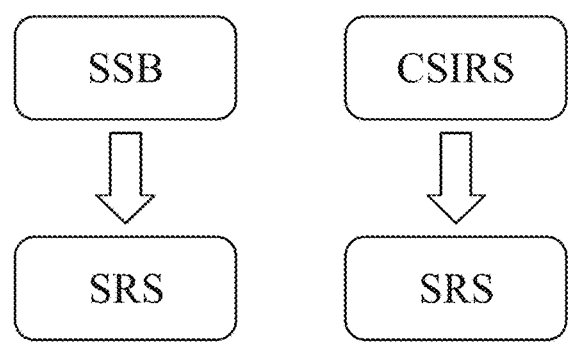
FIGS. 9A and 9B illustrate examples of spatial relationships between source and target signals.

FIG. 7 provides an overview of sidelink communications (broadcast and groupcast device-to-device (D2D)) between UEs. As noted above, with reference to FIGS. 4A and 4B, sidelink generally refers to a link between at least two users or user-relays that can be used in different scenarios and for different applications.

For example, for applications with in-coverage operation, both users are in a gNB's coverage, but still communicate directly. This can be assumed for enabling some gaming applications, for instance. For applications with partial-coverage operation, one UE is in-coverage, and acts as a relay to extend the coverage for other users. For applications with out-of-coverage operation, users are outside the gNB's coverage, but still need to communicate. This type of operation is important for mission critical applications, such as vehicle-to-everything (V2X) and public safety.

As illustrated in FIG. 7, the resource allocation for sidelink (SL) communications can be done in different ways. In a first mode, Mode 1, the gNB "schedules" the SL resources to be used by the UE for SL transmission.

For a second mode, Mode 2, the UE determines the SL resources (e.g., the gNB does not schedule SL transmission resources within SL resources configured by gNB/network). In this case, the UE autonomously selects SL resources for transmission. A UE can assist in SL resource selection for other UEs. A UE may be configured with an NR configured grant for SL transmission and the UE may schedule SL transmissions for other UEs.

There are various cases that may be encountered involving sidelink communications and communications involving a cellular link (Uu) between a UE and gNB. In one case, Case 1, for licensed bands, the NR Uu and NR SL might be concurrently transmitted/received on the same carrier. In a second case, Case 2, for some other applications, such as public safety or V2X, a dedicated (licensed or unlicensed) carrier (e.g., intelligent transport systems (ITS) for V2X)), NR Uu and NR SL may transmit/receive on different carriers.

For both of these cases (e.g., when Uu and SL should coexist on a given carrier or a number of carriers), the applicability of DLPI and ULPI should be considered. It should be noted that DLPI or ULPI received on one carrier can be applicable to the same or different carriers.

DLPI in Rel. 15 NR, is a post-indication scheme (e.g., as shown in FIG. 5B), and is used to let an eMBB UE know that some of the previously assigned resources are re-claimed. Based on this information, the UE can set the log likelihood ratios (LLRs) associated with the indicated resources to zero before decoding, which may help enhance the successful decoding probability. The resources might have been reclaimed by the gNB to schedule a more urgent traffic (e.g., URLLC for another UE).

ULPI is introduced in Rel. 16 NR, and may be used, for example, to suspend the uplink transmission of an eMBB user. In some cases, the gNB might decide to silence an eMBB user in order to schedule a URLLC user over the previously assigned resources and may signal ULPI accordingly.

QCL Port and TCI States

In some cases, a UE may be configured with up to M TCI-States by higher layer signalling to decode physical downlink shared channel (PDSCH) according to a detected physical downlink control channel (PDCCH) with downlink control information (DCI). Each configured transmission configuration indication (TCI) state includes one RS set TCI-RS-SetConfig. FIGS. 8A-8B, 9A-9B, and 10A-10B illustrate examples of such TCI-RS-SetConfigs that associate DL reference signals with corresponding quasi co-location (QCL) types.

In the figures, a source reference signal (RS) is indicated in the top box and is associated with a target signal indicated in the bottom box. In other words, a UE may use the source RS to determine various channel parameters, depending on the associated QCL type, to process the target signal.

As illustrated, each TCI-RS-SetConfig contains parameters for configuring quasi co-location relationship between the reference signals in the RS set and the demodulation reference signal (DMRS) port group of the PDSCH. The RS set contains a reference to either one or two DL RSs and an associated quasi co-location type (QCL-Type) for each one configured by the higher layer parameter QCL-Type.

As illustrated in FIG. 8B, for the case of two DL RSs, the QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

The quasi co-location (QCL) types indicated to the UE are based on the higher layer parameter QCL-Type and may take one or a combination of the following types:

QCL-TypeA: {Doppler shift, Doppler spread, average delay, delay spread}
QCL-TypeB: {Doppler shift, Doppler spread}
QCL-TypeC: {average delay, Doppler shift}
QCL-TypeD: {Spatial Rx parameter}

It may be noted that a target RS does not necessarily need to be PDSCH's DMRS, rather it can be any other RS: PUSCH DMRS, CSIRS, TRS, and SRS.

Figure 10A:
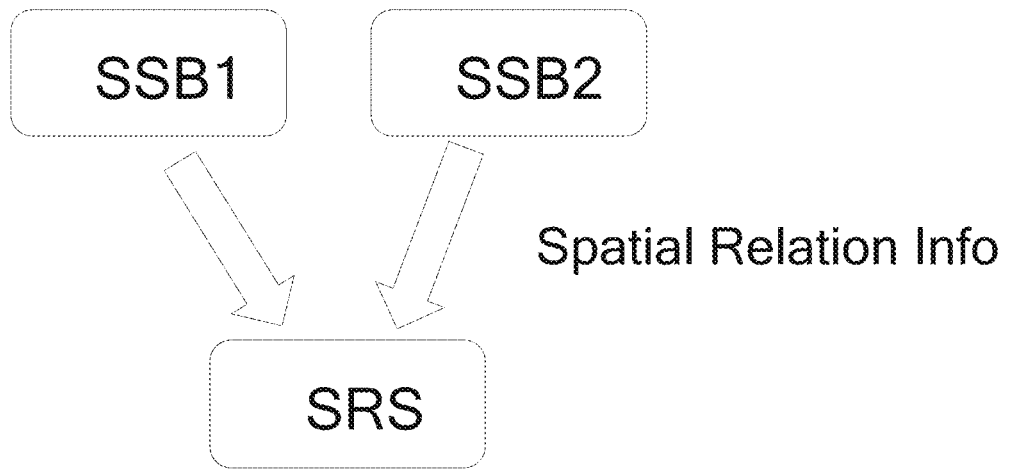
FIGS. 10A and 10B illustrate examples of spatial relationships between source and target signals in a multi-TRP/multi-panel scenario.
Figure 10B:
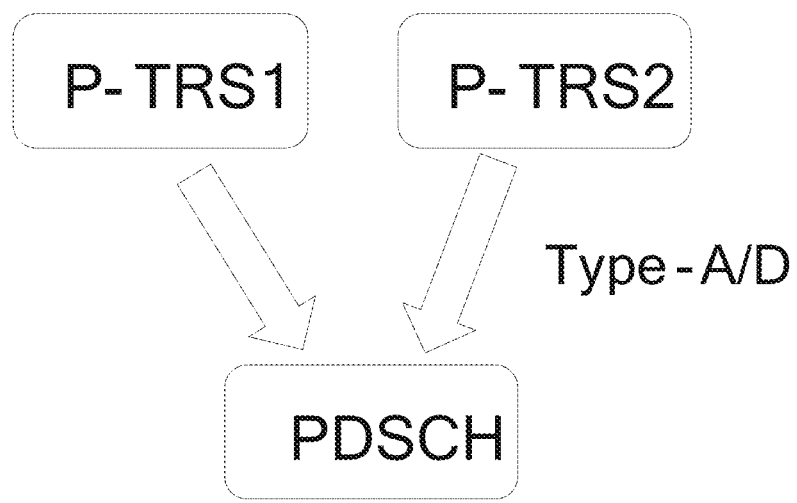

As illustrated in FIGS. 10A and 10B, TCI states may also be supported for scenarios with multiple transmitter receiver points (mTRPs) or multiple panels. In some cases, for TCI state configuration in order to enable one or two TCI states per a TCI code point, a MAC-CE enhancement may be used to map one or two TCI states for a TCI code point and/or the number of bits of the TCI field in DCI may be increased.

Example Spatial Preemption for Downlink, Uplink, and Sidelink

Aspects of the present disclosure provide apparatus, methods, processing systems, and computer readable mediums for signaling and processing an indication of spatial preemption (e.g., a spatial preemption indication (PI)). As will be described in greater detail below, the spatial PI may indicate at least one beam that a user equipment (UE) is to avoid using for transmitting or receiving a target signal.

Uplink (UL) spatial PI, as presented herein, may advantageously indicate which type of reference signal is preempted for the purpose of determining a transmit beam for UL transmission. For example, the indicated type may be channel state information reference signals (CSI-RS), a synchronization signal block (SSB), a sounding reference signal (SRS), or some other downlink (DL) or UL signal, while an identification number may be, for example, a CSI-RS identifier (ID) or an SSB index. Similarly, DL spatial PI may effectively indicate which type of reference signal (and ID number) is preempted for the purpose of determining a receive beam for receiving a DL transmission. Such spatial preemption may be used as an alternative to (or in addition to) conventional UL/DL preemption of time/frequency resources.

Figure 11:
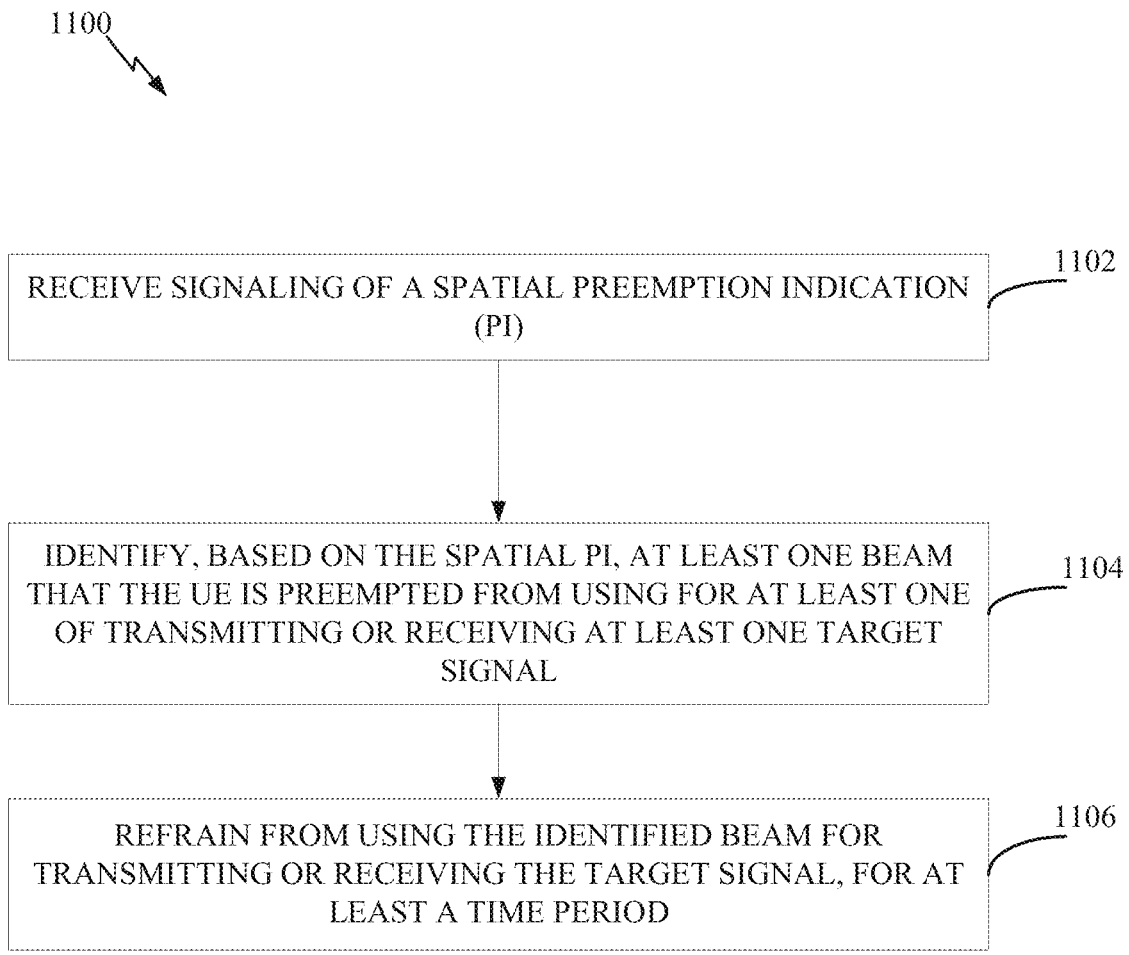
FIG. 11 illustrates example operations for wireless communication by a user equipment, in accordance with some aspects of the present disclosure.

FIG. 11 illustrates example operations 1100 for wireless communication by a UE, in accordance with some aspects of the present disclosure. For example, operations 1100 may be performed by UE 120a or 120b of FIG. 1 to process spatial PI (e.g., to determine a Tx beam to avoid using for an uplink transmission or a Rx beam to avoid using for a DL reception).

Operations 1100 begin, at 1102, by receiving signaling of a spatial preemption indication (PI). At 1104, the UE identifies, based on the spatial PI, at least one beam that the UE is preempted from using for at least one of transmitting or receiving at least one target signal. At 1106, the UE refrains from using the identified beam for transmitting or receiving the target signal, for at least a time period.

Figure 12:
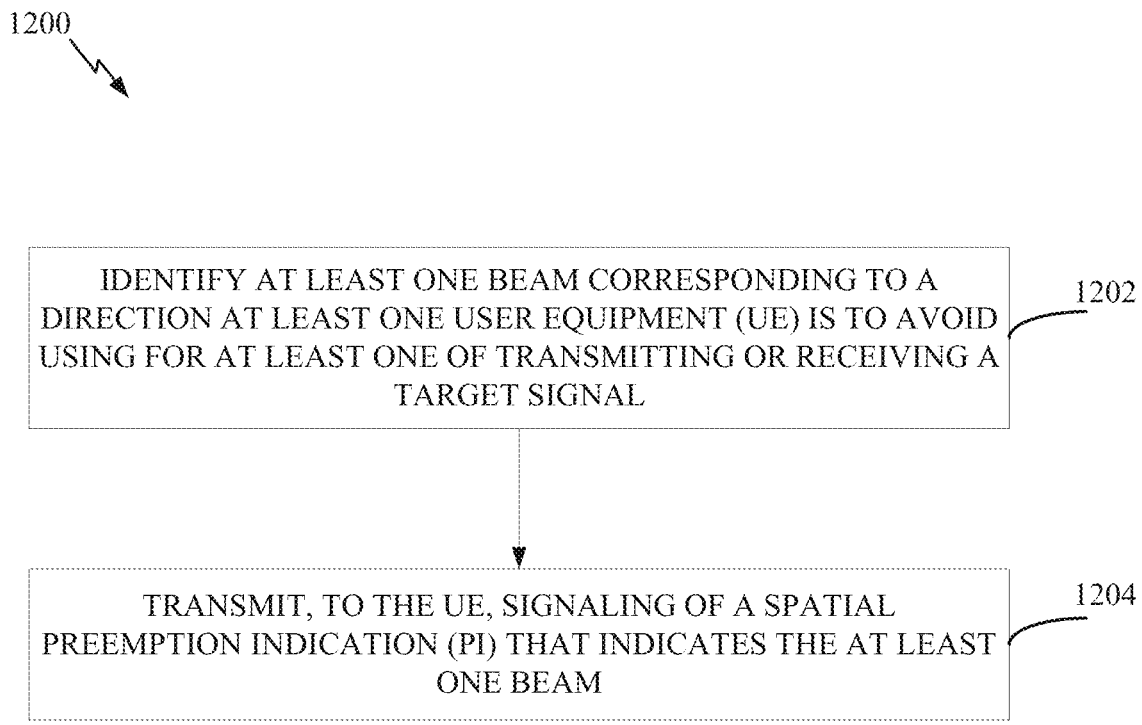
FIG. 12 illustrates example operations for wireless communication by an apparatus, in accordance with some aspects of the present disclosure.

FIG. 12 illustrates example operations 1200 for wireless communication by an apparatus. For example, operations 1200 may be performed by a UE 120a, UE 120b and/or BS 110a of FIG. 1 to provide spatial PI (to a UE).

Operations 1200 begin, at 1202, by identifying at least one beam corresponding to a direction at least one UE is to avoid using for at least one of transmitting or receiving a target signal. At 1204, the apparatus transmits, to the UE, signaling of a spatial PI that indicates the at least one beam.

Rather than preempt certain time/frequency resources, as conventional UL/DL PIs, a spatial PI proposed herein may advantageously preempt any signal transmitted with a specific beam on in other words in a specific transmit or receive beam direction.

For example, an UL spatial PI could effectively contain which SSB/CSIRS/SRS ID is preempted for the purpose of determining a transmit (Tx) beam for UL transmission. In other words, this UL spatial PI may be interpreted that a UE is to refrain from using SRS, physical uplink shared channel (PUSCH), and/or physical uplink control channel (PUCCH) resources, which have that specific spatial-Relation-Information configured for determining a Tx beam for some period of time.

It may be noted, however, that this UL PI may not mean that the RS which is indicated is necessarily preempted. Rather, what is preempted is the transmission of any other physical layer (PHY) channel that uses the indicated RS to derive the Tx spatial beam.

When UL spatial PI prevents a UE from using a configured beam for Tx, it has various options for the corresponding SRS/PUSCH/PUCCH that were supposed to be transmitted with that Tx beam. According to one option, the spatial PI may be interpreted to mean that these SRS resources are preempted also (and not transmitted) or that some other SSB/CSI-RS/SRS ID may be used to (determine a Tx beam to) transmit these SRS resources. In such cases, the UL PI may indicate this information.

According to another option, the spatial PI may be interpreted to mean that some other SSB/CSIRS/SRS ID shall be used to transmit these SRS resources (e.g., the spatial Tx PI should contain that information, or it could be some default beam). According to another option, the spatial PI may be interpreted to mean that the Tx beam used for a physical random access channel (PRACH) transmission during a latest initial access in the cellular network (Uu) should be used.

As noted above, DL spatial PI may advantageously indicate which type of reference signal is preempted for the purpose of determining a receive beam for receiving a DL transmission. As noted above, each TCI-state may be configured with a source RS (SSB or CS-IRS), and this is used by the UE to derive the spatial Rx beam to receive the target RS which is contained in the TCI-state.

Then, if the gNB notifies that that a source RS cannot be used for DL beam transmission, it may signal a DL spatial PI. The DL spatial PI may mean that the corresponding target DL signal is preempted, that the source RS cannot be used by the UE to derive spatial Rx beam, and/or that this same source signal may still transmitted but with a different Tx beam, in which case the UE should change the Rx beam accordingly.

As describe above with reference to FIGS. 10A and 10B, for multi-TRP or multi-panel deployments, there may be multiple spatial quasi co-located (QCL) RS defined. Thus, it may be possible to signal a spatial PI where one of the spatial relations (or QCLType-D) sources associated with some PHY channel (e.g., multi-TRP PDSCH) would be pre-empted.

There are various options for how the spatial PI may be interpreted in this case. For example, according to one option, the spatial PI could mean that only the subset of ports are preempted (e.g., a rank 4 transmission becomes a rank 2 transmission if one of the directions are preempted). If only a subset of ports are transmitted, for the case of PDSCH, the rate matching may be adjusted accordingly. For the case of CSI-RS, the power boosting of the remaining ports may be adjusted accordingly.

According to another option, the spatial PI could mean that another beam should be substituted for the preempted beam (and all the ports may still be transmitted).

Figure 13A:
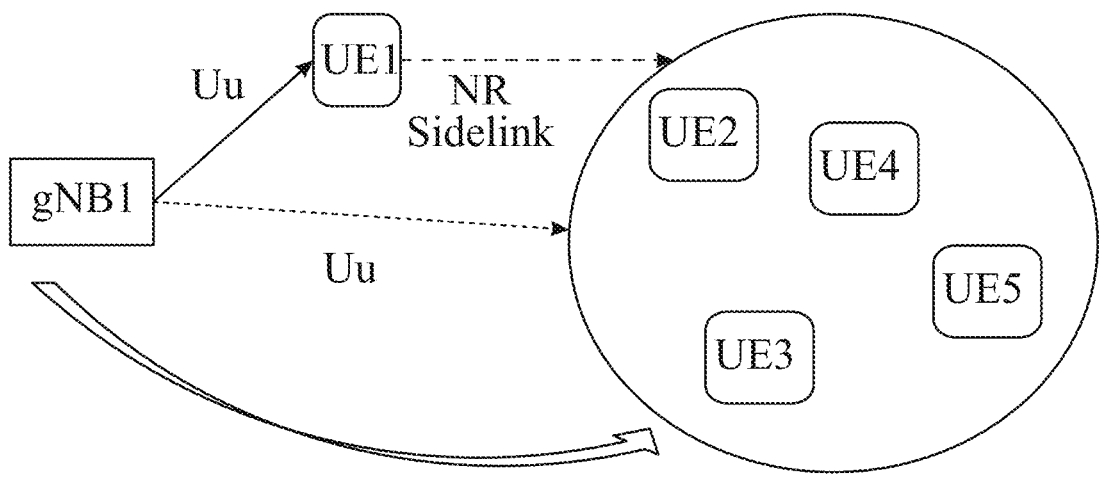
FIGS. 13A-13C illustrate example of spatial preemption for sidelink communications, in accordance with some aspects of the present disclosure.

For sidelink communications, a gNB may send the spatial PI through a group common DCI to a group of UEs, as indicated in FIG. 13A. In this case, the spatial PI may preempt, for all the UEs in the group, the transmission(s) in a spatial direction or the reception from a spatial direction.

Figure 13B:
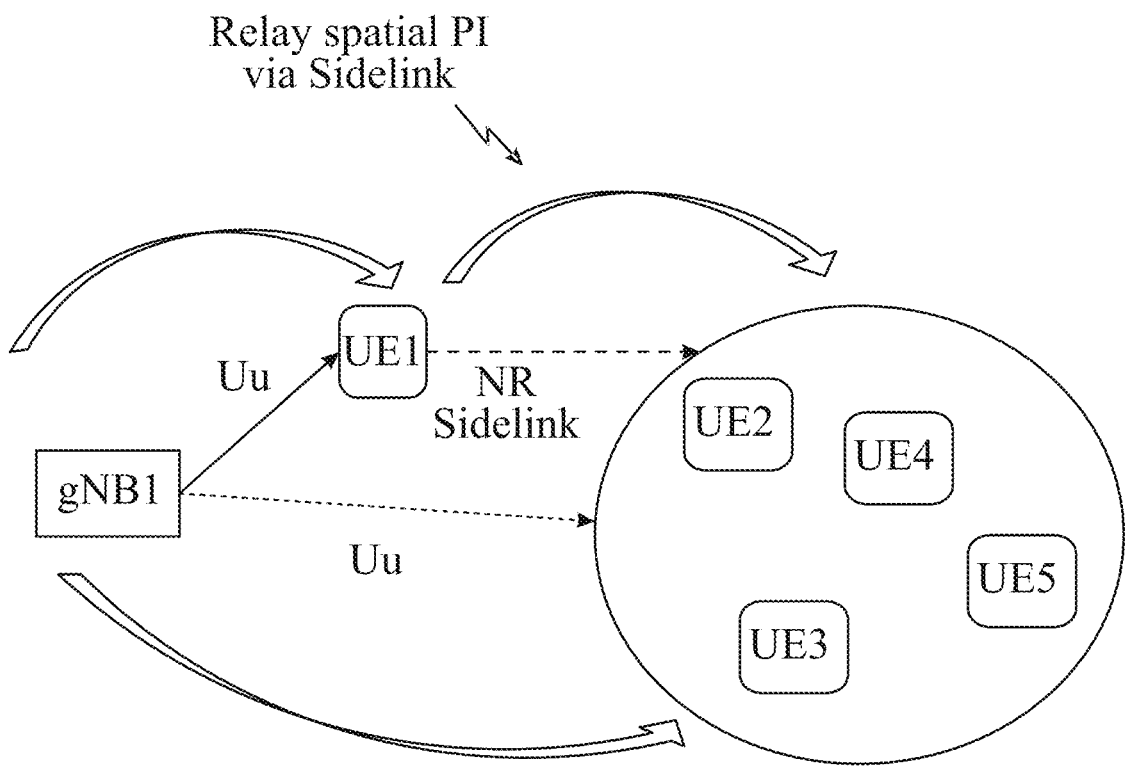

As illustrated in FIG. 13B, in case of partial coverage, a gNB may request that a SL UE (e.g., UE1) is to relay the spatial PI through the SL (as a physical sidelink control channel (PSCCH) group common message). In this case, the gNB first triggers the spatial PI to UE1 with information related to which UEs (or SL traffic) that UE1 is responsible for relaying.

Figure 13C:
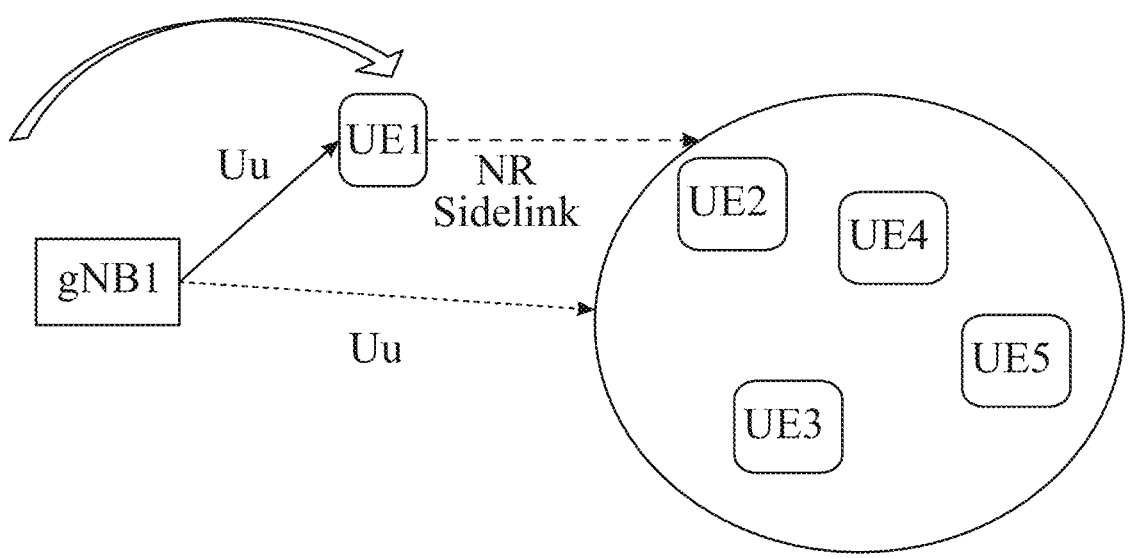

As illustrated in FIG. 13C, a gNB may preempt not only the spatial directions that the gNB transmits, but also the spatial directions that UE 1 transmits towards the SL UEs. In this case, the spatial PI indication may contain the RS IDs of the UE1 that correspond to the SL BWP. Thus, the spatial PI indication of a SL spatial beam (either of gNB1 or UE1), may be received from a SL bandwidth part (BWP) or a Uu BWP.

In some cases, the spatial PI indication may be applicable for a given time period. The time period, for example, may be a time period during which the spatial beam is preempted (e.g., persistent spatial PI) for a "one-shot" preemption for the PHY channels in the current slot (current spatial PI), or a "one-shot" preemption for the PHY channels in the previous slot (post spatial PI).

The spatial PI may apply to a variety of different types of DL signals, such as CSIRS, TRS, DL PRS, DMRS, PDSCH, and PDCCH. The spatial PI may apply to a variety of different types of UL signals, such as SRS, PUSCH, PUCCH, UL PRS, and DMRS. The spatial PI may apply to a variety of different types of sidelink (SL) signals, such as PSSCH, PSCCH, PSFCH

EXAMPLE EMBODIMENTS

Embodiment 1

A method of wireless communications by a user equipment (UE), comprising receiving signaling of a spatial preemption indication (PI), identifying, based on the spatial PI, at least one beam that the UE is preempted from using for at least one of transmitting or receiving at least one target signal, and refraining from using the identified beam for transmitting or receiving the target signal, for at least a time period.

Embodiment 2

The method of Embodiment 1, wherein the UE identifies the beam based on a spatial relationship between a source reference signal and the target signal.

Embodiment 3

The method of Embodiment 2, wherein the target signal comprises at least one of an uplink physical channel or a sidelink physical signal, and the UE is configured to refrain from transmitting the uplink physical channel or sidelink channel using a transmit beam derived from the source reference signal.

Embodiment 4

The method of Embodiment 3, wherein the UE is configured to skip transmitting the uplink physical channel or sidelink channel, or determine an alternative transmit beam for transmitting the uplink physical channel or sidelink channel, the alternative transmit beam is signaled with the spatial PI, or a default transmit beam is used as the alternative transmit beam, the default transmit beam comprising a transmit beam used for a physical random access channel (PRACH) transmission during a previous initial network access.

Embodiment 5

The method of any of Embodiments 2-4, wherein the target signal comprises at least one of a downlink physical channel or a sidelink physical signal, and the UE is configured to refrain from receiving the downlink physical channel or sidelink channel using a receive beam derived from the source reference signal.

Embodiment 6

The method of Embodiment 5, wherein the UE is configured to skip processing the downlink physical channel or sidelink channel, or determine an alternative receive beam for processing the downlink physical channel or sidelink channel, and one of the alternative receive beam is signaled with the spatial PI, or a default receive beam is used as the alternative receive beam, the default receive beam comprising a receive beam used for a previous initial network access.

Embodiment 7

The method of any of Embodiments 1-6, wherein the UE identifies the beam based on one of multiple spatial relationships between at least two source reference signals and the target signal, wherein the at least two source reference signals associated with different transmitter receiver points or different antenna panels, and the spatial PI indicates the one of the multiple spatial relationships.

Embodiment 8

The method of any of Embodiments 1-7, wherein the spatial PI indicates that only a subset of ports are preempted for transmitting or receiving the target signal.

Embodiment 9

The method of Embodiment 8, wherein the target signal comprises a physical downlink shared channel, and the UE is configured to perform rate matching for a physical downlink shared channel (PDSCH) based on the preempted subset of ports, or the target signal comprises a channel state information reference signal (CSI-RS) with power boosting adjusted on one or more remaining ports that are not preempted.

Embodiment 10

The method of any of Embodiments 1-9, wherein the spatial PI indicates that another beam is substituted for the identified beam and no ports are preempted for transmitting or receiving the target signal.

Embodiment 11

The method of any of Embodiments 1-10, wherein the spatial PI is signaled via a group common downlink control information (DCI) transmission to a group of UEs that communicate via sidelink channels.

Embodiment 12

The method of any of Embodiments 1-11, wherein the UE is further configured to relay the spatial PI to one or more other UEs via a sidelink channel.

Embodiment 13

The method of any of Embodiments 1-12, wherein the at least one target signal comprises at least one target sidelink signal, and the UE identifies the beam based on a spatial relationship between a sidelink reference signal identified in the spatial PI and the target sidelink signal.

Embodiment 14

The method of Embodiment 13, wherein the spatial PI is received via at least one of a sidelink bandwidth part (BWP), or a BWP used for communication between the UE and a base station.

Embodiment 15

The method of any of Embodiments 1-14, wherein the time period is associated with a time period during which spatial PI is valid until additional signaling indicates otherwise, a current transmission time interval (TTI), or a previous TTI.

Embodiment 16

The method of any of Embodiments 1-15, wherein the target signal comprises a downlink signal comprising at least one of channel state information reference signal (CSI-RS), timing reference signal (TRS), downlink positioning reference signal (DL PRS), demodulation reference signal (DMRS), physical downlink shared channel (PDSCH), or a physical downlink control channel (PDCCH).

Embodiment

17. The method of Embodiment 1, wherein the target signal comprises an uplink signal comprising at least one of: a sounding reference signal (SRS), physical uplink shared channel (PUSCH), physical uplink control channel (PUCCH), uplink positioning reference signal (UL PRS), or demodulation reference signal (DMRS).

Embodiment 18

The method of any of Embodiments 1-17, wherein the target signal comprises a sidelink signal comprising at least one of: a physical sidelink shared channel (PSSCH), physical sidelink control channel (PSCCH), or physical sidelink feedback channel (PSFCH).

Embodiment 19

A method of wireless communications by an apparatus, comprising identifying at least one beam corresponding to a direction at least one user equipment (UE) is to avoid using for at least one of transmitting or receiving a target signal, and transmitting, to the UE, signaling of a spatial preemption indication (PI) that indicates the at least one beam.

Embodiment 20

The method of Embodiment 19, wherein the spatial PI indicates the beam based on a spatial relationship between a source reference signal and the target signal.

Embodiment 21

The method of Embodiment 20, wherein the target signal comprises at least one of an uplink physical channel or a sidelink physical signal, and the spatial PI indicates the UE is to refrain from transmitting the uplink physical channel or sidelink channel using a transmit beam derived from the source reference signal.

Embodiment 22

The method of Embodiment 20 or 21, wherein the spatial PI indicates the UE is to skip transmitting the uplink physical channel or sidelink channel, or determine an alternative transmit beam for transmitting the uplink physical channel or sidelink channel, and the alternative transmit beam is signaled with the spatial PI.

Embodiment 23

The method of any of Embodiments 20-22, wherein the target signal comprises at least one of a downlink physical channel or a sidelink physical signal, and the spatial PI indicates the UE is to refrain from receiving the downlink physical channel or sidelink channel using a receive beam derived from the source reference signal.

Embodiment 24

The method of any of Embodiments 20-23, wherein the spatial PI indicates the UE is to skip processing a downlink physical channel or sidelink channel, or determine an alternative receive beam for processing the downlink physical channel or the sidelink channel.

Embodiment 25

The method of Embodiment 24, wherein the alternative receive beam is signaled with the spatial PI.

Embodiment 26

The method of any of Embodiments 19-25, wherein the spatial PI indicates the UE is to identify the beam based on one of multiple spatial relationships between at least two source reference signals and the target signal, wherein the at least two source reference signals associated with different transmitter receiver points or different antenna panels, and the spatial PI indicates the one of the multiple spatial relationships.

Embodiment 27

The method of any of Embodiments 19-26, wherein the spatial PI indicates that only a subset of ports are preempted for transmitting or receiving the target signal.

Embodiment 28

The method of Embodiment 27, wherein the target signal comprises a physical downlink shared channel, and the spatial PI indicates the UE is to perform rate matching for a physical downlink shared channel (PDSCH) based on the preempted subset of ports.

Embodiment 29

An apparatus for wireless communications, comprising means for receiving signaling of a spatial preemption indication (PI), means for identifying, based on the spatial PI, at least one beam that the apparatus is preempted from using for at least one of transmitting or receiving at least one target signal, and means for refraining from using the identified beam for transmitting or receiving the target signal, for at least a time period.

Embodiment 30

An apparatus for wireless communications, comprising means for identifying at least one beam corresponding to a direction at least one user equipment (UE) is to avoid using for at least one of transmitting or receiving a target signal, and means for transmitting, to the UE, signaling of a spatial preemption indication (PI) that indicates the at least one beam.

Embodiment 31

An apparatus for wireless communication by a UE, comprising a memory and at least one processor coupled to the memory, the memory and the at least one processor being configured to receive signaling of a spatial PI, identifying, based on the spatial PI, at least one beam that the UE is preempted from using for at least one of transmitting or receiving at least one target signal, and refrain from using the identified beam for transmitting or receiving the target signal, for at least a time period.

Embodiment 32

A computer readable medium having instructions stored thereon for receiving signaling of a spatial PI, identifying, based on the spatial PI, at least one beam that the UE is preempted from using for at least one of transmitting or receiving at least one target signal, and refraining from using the identified beam for transmitting or receiving the target signal, for at least a time period.

Embodiment 33

An apparatus for wireless communication by an apparatus, comprising a memory and at least one processor coupled to the memory, the memory and the at least one processor being configured to identify at least one beam corresponding to a direction at least one UE is to avoid using for at least one of transmitting or receiving a target signal, and transmit, to the UE, signaling of a spatial PI that indicates the at least one beam.

Embodiment 34

A computer readable medium having instructions stored thereon for identifying at least one beam corresponding to a direction at least one UE is to avoid using for at least one of transmitting or receiving a target signal and transmitting, to the UE, signaling of a spatial PI that indicates the at least one beam.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method of wireless communications by a user equipment (UE), comprising:
receiving signaling of a spatial preemption indication (PI);
identifying, based on the spatial PI, at least one beam that the UE is preempted from using for at least one of transmitting or receiving at least one target signal;
refraining from using the identified at least one beam for transmitting or receiving the at least one target signal, for at least a time period; and
determining an alternative beam for transmitting or receiving the at least one target signal in response to receiving the spatial PI, wherein a default beam is used as the alternative beam, the default beam comprising a beam used for a physical random access channel (PRACH).

2. The method of claim 1, wherein identifying the at least one beam comprises identifying the at least one beam based on a spatial relationship between a source reference signal and the at least one target signal.

3. The method of claim 2, wherein:
the at least one target signal comprises at least one of an uplink physical channel or a sidelink physical channel; and
refraining from using the identified at least one beam comprises refraining from transmitting the uplink physical channel or the sidelink channel using a transmit beam derived from the source reference signal.

4. The method of claim 1, wherein:
the alternative beam is signaled with the spatial P.

5. The method of claim 2, wherein:
the at least one target signal comprises at least one of a downlink physical channel or a sidelink physical channel; and
refraining from using the identified at least one beam comprises refraining from receiving the downlink physical channel or the sidelink channel using a receive beam derived from the source reference signal.

6. The method of claim 1, wherein the spatial PI indicates that only a subset of ports are preempted for transmitting or receiving the at least one target signal.

7. The method of claim 1, wherein the spatial PI indicates that the alternative beam is substituted for the identified at least one beam and no ports are preempted for transmitting or receiving the at least one target signal.

8. The method of claim 1, wherein:
the spatial PI is signaled via a group common downlink control information (DCI) transmission to a group of UEs that communicate via sidelink channels.

9. The method of claim 1, further comprising relaying the spatial PI to one or more other UEs via a sidelink channel.

10. The method of claim 1, wherein:
the at least one target signal comprises at least one target sidelink signal; and
identifying the at least one beam comprises identifying the at least one beam based on a spatial relationship between a sidelink reference signal identified in the spatial PI and the target sidelink signal.

11. The method of claim 10, wherein the spatial PI is received via at least one of:
a sidelink bandwidth part (BWP); or
a BWP used for communication between the UE and a base station.

12. The method of claim 1, wherein the time period is associated with:
a time period during which spatial PI is valid until additional signaling indicates otherwise;
a current transmission time interval (TTI); or
a previous TTI.

13. The method of claim 1, wherein the at least one target signal comprises a downlink signal comprising at least one of: channel state information reference signal (CSI-RS), timing reference signal (TRS), downlink positioning reference signal (DL PRS), demodulation reference signal (DMRS), physical downlink shared channel (PDSCH), or a physical downlink control channel (PDCCH).

14. The method of claim 1, wherein the at least one target signal comprises an uplink signal comprising at least one of: a sounding reference signal (SRS), physical uplink shared channel (PUSCH), physical uplink control channel (PUCCH), uplink positioning reference signal (UL PRS), or demodulation reference signal (DMRS).

15. The method of claim 1, wherein the at least one target signal comprises a sidelink signal comprising at least one of: a physical sidelink shared channel (PSSCH), physical sidelink control channel (PSCCH), or physical sidelink feedback channel (PSFCH).

16. The method of claim 1, further comprising communicating the target signal via the alternative beam in the time period.

17. A method of wireless communications by a user equipment (UE), comprising:
  receiving signaling of a spatial preemption indication (PI),
  identifying, based on the spatial PI, at least one beam that the UE is preempted from using for at least one of transmitting or receiving at least one target signal, wherein identifying the at least one beam comprises identifying the at least one beam based on one of multiple spatial relationships between at least two source reference signals and the at least one target signal, wherein the at least two source reference signals are associated with different transmitter receiver points or different antenna panels, and wherein the spatial PI indicates the one of the multiple spatial relationships;
  refraining from using the identified at least one beam for transmitting or receiving the at least one target signal, for at least a time period; and
  determining an alternative beam for transmitting or receiving the at least one target signal in response to receiving the spatial PI.

18. A method of wireless communications by an apparatus, comprising:
  identifying at least one beam corresponding to a direction at least one user equipment (UE) is to avoid using for at least one of transmitting or receiving a target signal;
  transmitting, to the UE, signaling of a spatial preemption indication (PI) that indicates the at least one beam; and
  determining an alternative beam for transmitting or receiving the target signal in response to transmitting the spatial PI, wherein a default beam is used as the alternative beam, the default beam comprising a beam used for a physical random access channel (PRACH).

19. The method of claim 18, wherein the spatial PI indicates the at least one beam based on a spatial relationship between a source reference signal and the target signal.

20. The method of claim 19, wherein:
  the target signal comprises at least one of an uplink physical channel or a sidelink physical channel; and
  the spatial PI indicates the UE is to refrain from transmitting the uplink physical channel or the sidelink channel using a transmit beam derived from the source reference signal.

21. The method of claim 18, wherein:
  the alternative beam is signaled with the spatial PI.

22. The method of claim 19, wherein:
  the target signal comprises at least one of a downlink physical channel or a sidelink physical signal; and
  the spatial PI indicates the UE is to refrain from receiving the downlink physical channel or sidelink channel using a receive beam derived from the source reference signal.

23. The method of claim 18, wherein the spatial PI indicates that only a subset of ports are preempted for transmitting or receiving the target signal.

24. The method of claim 18, further comprising communicating the target signal via the alternative beam.

25. A method of wireless communications by an apparatus, comprising:
  identifying at least one beam corresponding to a direction at least one user equipment (UE) is to avoid using for at least one of transmitting or receiving a target signal;
  transmitting, to the UE, signaling of a spatial preemption indication (PI) that indicates the at least one beam, wherein the spatial PI indicates the UE is to identify the at least one beam based on one of multiple spatial relationships between at least two source reference signals and the target signal, wherein the at least two source reference signals are associated with different transmitter receiver points or different antenna panels, and wherein the spatial PI indicates the one of the multiple spatial relationships; and
  determining an alternative beam for transmitting or receiving the target signal in response to transmitting the spatial PI.

26. An apparatus for wireless communications, comprising:
  means for receiving signaling of a spatial preemption indication (PI);
  means for identifying, based on the spatial PI, at least one beam that the apparatus is preempted from using for at least one of transmitting or receiving at least one target signal;
  means for refraining from using the identified at least one beam for transmitting or receiving the at least one target signal, for at least a time period; and
  means for determining an alternative beam for transmitting or receiving the at least one target signal in response to receiving the spatial PI, wherein a default beam is used as the alternative beam, the default beam comprising a beam used for a physical random access channel (PRACH).

27. An apparatus for wireless communications, comprising:
  means for identifying at least one beam corresponding to a direction at least one user equipment (UE) is to avoid using for at least one of transmitting or receiving a target signal;
  means for transmitting, to the UE, signaling of a spatial preemption indication (PI) that indicates the at least one beam; and
  means for determining an alternative beam for transmitting or receiving the target signal in response to transmitting the spatial PI, wherein a default beam is used as the alternative beam, the default beam comprising a beam used for a physical random access channel (PRACH).

* * * * *